(12) United States Patent
Sadacharam et al.

(10) Patent No.: US 11,507,605 B2
(45) Date of Patent: Nov. 22, 2022

(54) RELATIONSHIP DISCOVERY

(71) Applicant: INTERNATIONAL BUSINESS MACHINES CORPORATION, Armonk, NY (US)

(72) Inventors: Saravanan Sadacharam, Chennai (IN); Manish Anand Bhide, Hyderabad (IN); Vijay Ekambaram, Chennai (IN); Vijay Kumar Ananthapur Bache, Karnataka (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 841 days.

(21) Appl. No.: 16/406,004

(22) Filed: May 7, 2019

(65) Prior Publication Data

US 2020/0356580 A1 Nov. 12, 2020

(51) Int. Cl.
 G06F 16/28 (2019.01)
 G06F 16/29 (2019.01)
 H04W 12/69 (2021.01)

(52) U.S. Cl.
 CPC ............ *G06F 16/288* (2019.01); *G06F 16/29* (2019.01); *H04W 12/69* (2021.01)

(58) Field of Classification Search
 CPC ....... G06F 16/288; G06F 16/29; H04W 12/69
 USPC ...................................................... 713/167
 See application file for complete search history.

(56) References Cited

U.S. PATENT DOCUMENTS

| | | | | |
|---|---|---|---|---|
| 3,654,557 A | * | 4/1972 | Sakamoto | H03J 5/0227 334/18 |
| 7,177,594 B2 | * | 2/2007 | Burr | H04L 67/04 709/239 |
| 9,867,050 B1 | * | 1/2018 | Kamini | H04W 12/084 |
| 9,918,213 B2 | * | 3/2018 | Chang | H04W 56/001 |

(Continued)

FOREIGN PATENT DOCUMENTS

| | | | | |
|---|---|---|---|---|
| CN | 104252669 A | * | 12/2014 | |
| CN | 108270917 A | * | 7/2018 | ........... G06F 21/602 |

(Continued)

OTHER PUBLICATIONS

Noor et al., "TrustBook: Web of Trust Based Relationship Establishment in Online Social Networks," 2013 11th International Conference on Frontiers of Information Technology, 2013, pp. 223-228, doi: 10.1109/FIT.2013.48. (Year: 2013).*

(Continued)

*Primary Examiner* — Peter C Shaw
(74) *Attorney, Agent, or Firm* — Cuenot, Forsythe & Kim, LLC (57) ABSTRACT

Relationship discovery can include receiving at a first mobile device a pair of ultrasonic signals conveyed at different frequencies from a second mobile device. The pair of ultrasonic signals can convey, respectively, a second user's contact information in an encrypted form and a key indicator. A contact number can be selected from a first user's contact list electronically stored on the first mobile device. The contact number can be selected based on the key indicator. A mutual contact can be identified in response to decrypting the second user's contact information using the contact number as a decryption key.

20 Claims, 11 Drawing Sheets

(56) References Cited

U.S. PATENT DOCUMENTS

| | | | | |
|---|---|---|---|---|
| 2005/0174975 | A1* | 8/2005 | Mgrdechian | H04L 67/306 370/338 |
| 2011/0113149 | A1* | 5/2011 | Kaal | H04L 61/4594 709/231 |
| 2012/0066139 | A1 | 3/2012 | Guzman et al. | |
| 2012/0173881 | A1* | 7/2012 | Trotter | H04L 9/0894 713/189 |
| 2013/0040596 | A1 | 2/2013 | Paim et al. | |
| 2013/0097562 | A1* | 4/2013 | Kermoian | H04M 1/575 715/841 |
| 2013/0218959 | A1 | 8/2013 | Sa et al. | |
| 2014/0279626 | A1 | 9/2014 | Joo et al. | |
| 2015/0131539 | A1* | 5/2015 | Tsfaty | H04B 11/00 370/329 |
| 2015/0302533 | A1* | 10/2015 | Thakur | G06Q 10/00 705/319 |
| 2015/0310568 | A1* | 10/2015 | Sadeghpour | G06Q 50/01 705/14.19 |
| 2016/0255163 | A1* | 9/2016 | Stathacopoulos | H04L 67/535 709/224 |

FOREIGN PATENT DOCUMENTS

| | | | | |
|---|---|---|---|---|
| CN | 108964787 A | * | 12/2018 | H04B 11/00 |
| CN | 111901788 A | * | 11/2020 | |
| EP | 2584458 A1 | * | 4/2013 | G06F 3/04883 |
| JP | 2005275436 A | * | 10/2005 | |
| WO | 2005006152 A2 | | 1/2005 | |
| WO | 2015112989 A1 | | 7/2015 | |
| WO | WO-2018069912 A1 | * | 4/2018 | G06F 15/16 |
| WO | 2020225148 A1 | | 11/2020 | |
| WO | WO-2020225148 A1 | * | 11/2020 | G06F 16/288 |

OTHER PUBLICATIONS

Li et al., "Secure Friend Discovery Based on Encounter History in Mobile Social Networks," 2014 International Conference on Identification, Information and Knowledge in the Internet of Things, 2014, pp. 280-285, doi: 10.1109/IIKI.2014.64. (Year: 2014).*

WIPO Appln. No. PCT/EP2020/062195, Written Opinion, dated Nov. 12, 2020, 6 pg.

WIPO Appln. No. PCT/EP2020/062195, Int'l. Search Report, dated Aug. 7, 2020, 3 pg.

IBM: List of IBM Patents or Patent Applications Treated as Related, 2 pg.

Sadacharam, S. et al., "Relationship Discovery," WIPO Patent Application No. PCT/EP2020/062195, filed May 1, 2020, 29 pages (See WO2020225148A1, publication of application, cited herein).

AU Appln. No. 2020267811 First Examination Report, dated Jun. 21, 2022, 2 pg.

"Raspberry Pi: How can I detect the direction of a sound?", [online] Quora.com, Mar. 13, 2015, retrieved from the Internet: <https://www.quora.com/Raspberry-Pi-How-can-I-detect-the-direction-of-a-sound>, 4 pg.

Mayrhofer, R. et al., "An Authentication Protocol using Ultrasonic Ranging," Lancasster University, Technical Report No. COMP-002-2006, Oct. 2006, 12 pg.

"A Smart Microphone that Detects and Moves in the Direction of Sound Source," [online] Engineers Garage © 2019, retrieved from the Internet: <https://www.engineersgarage.com/contribution/expert/sound-localization-and-triangulation>, 10 pg.

Dickson, B.W., "Wireless Communication Options for a Mobile Ultrasound System," Thesis submission, Worcester Polytechnic Institute, Aug. 2008, 252 pg.

Wisneski, C., "The Physics of Information Final Project: Ultrasonics for Local Area Communication," [online] retrieved from the Internet: <http://www.media.mit.edu/people/wiz/physics.html>, 2 pg.

Munson, L., "Using ambient sound as a two-factor authentication system," [online] Naked Security by Sophos, Sophos Ltd. © 1997-2019, Aug. 17, 2015, retrieved from the Internet: <https://nakedsecurity.sophos.com/2015/08/17/using-ambient-sound-as-a-two-factor-authentication-system/> 3 pg.

Karapanos, N. et al., "Sound-Proof: Usable Two-Factor Authentication Based on Ambient Sound," Proc. of 24th USENIX Security Symposium, Aug. 12-1, 2015, 17 pg.

Ozhiganov, I., "NFC Alternative: Transferring Data Between Mobile Devices Using Ultrasound," [online] AZOFT, Oct. 9,2016, retrieved from the Internet: <https://www.azoft.com/blog/nfc-alternative-ultrasound/>, 6 pg.

"Sound Origin Direction Finder," [online] Best-MicroController-Projects © 2005-2019 [retreived Feb. 20, 2019], retrieved from the Internet: <https://www.best-microcontroller-projects.com/sound-origin-direction-finder.html>, 11 pg.

* cited by examiner

RELATIONSHIP DISCOVERY

BACKGROUND

The present disclosure relates to the field of electronic communication, and more particularly, to the discovery of mutual relationships through electronic communication using mobile devices.

Communication service providers enable users of mobile communication devices to communicate across vast distances with acquaintances, colleagues, friends, and family. Many business and social interactions are now conducted over such communication networks. Social networking services allow communication among an even broader group of individuals, enabling individuals who have no other relationship with one another to discover that nonetheless the individuals share one or more mutual contacts involving third parties.

SUMMARY

A method can include receiving, at a first mobile device, a pair of ultrasonic signals at different frequencies from a second mobile device, the pair of ultrasonic signals conveying, respectively, a second user's contact information in an encrypted form and a key indicator. The method also can include selecting a contact number from a first user's contact list electronically stored on the first mobile device, the selecting based on the key indicator. Additionally, the method can include identifying a mutual contact in response to decrypting the second user's contact information using the contact number as a decryption key.

A system can include a transceiver of a first mobile device configured to receive a pair of ultrasonic signals at different frequencies from a second mobile device, the pair of ultrasonic signals conveying, respectively, a second user's contact information in an encrypted form and a key indicator. The system also can include at least one processor operatively coupled to the transceiver and programmed to initiate executable operations. The executable operations can include selecting a contact number from a first user's contact list electronically stored on the first mobile device, the selecting based on the key indicator. The executable operations also can include identifying a mutual contact in response to decrypting the second user's contact information using the contact number as a decryption key.

A computer program product includes a computer-readable storage medium in which is stored program code, the program code executable by a processor of a first mobile device for initiating operations. The operations can include receiving, at the first mobile device, a pair of ultrasonic signals at different frequencies from a second mobile device, the pair of signals conveying, respectively, a second user's contact information in an encrypted form and a key indicator. The operations also can include selecting a contact number from a first user's contact list electronically stored on the first mobile device, the selecting based on the key indicator. Additionally, the operations can include identifying a mutual contact in response to decrypting the second user's contact information using the contact number as a decryption key.

DETAILED DESCRIPTION

During times of emergency that can arise for example from natural or man-made disasters, individuals often use mobile devices (e.g., cellular phone) to contact emergency services providers, as well as communicate with family and friends. These modes of communication, however, may be unavailable owing to communication network failures that can occur as a result of such emergencies. A mobile device can be rendered useless if communication networks on which the device user relies are seriously impaired or rendered inoperable.

Communication with known individuals—whether service providers, family, friends, or colleagues—through phone calls, messages, the Internet, or other modes of communication may be impossible due to connectivity failures. An individual may be in unfamiliar surroundings (e.g., railway station, hospital) when calamity occurs. The individual may be in dire need of financial or other help. The individual may simply seek the reassurance of having someone nearby on whom the individual can rely. Though many other similarly situated individuals may be nearby, all may be strangers.

Notwithstanding that all individuals near to one another may be strangers, there may be hidden relationships among the individuals that if discovered would reveal some commonality. For example, the sibling of one individual may be a colleague or close friend of another individual nearby. A colleague of one individual may be the neighbor of another individual. Various other mutual relationships are possible. Commonality can foster a bond that, especially under the stress of a common emergency, can be formed quickly and enduringly between strangers facing a calamity or situational emergency.

The systems, methods, and computer program products disclosed herein enable mobile devices to be used to discover hidden relationships among nearby individuals and to communicate with one another despite a lack of network connections. In one embodiment, a mobile device thus enabled transmits and receives phone contact lists and self-identifying information between individuals identified as each having relationship (e.g., family member-colleague, common friend, neighbor-colleague) with a mutual contact.

Mobile devices enabled with the systems, methods, or computer program products disclosed do not rely on network access, pairing, or pre-configuration, but rather utilize ultrasonic signals to transmit and receive information and to discover hidden relationships. The systems, methods, or computer program products disclosed additionally can encrypt and decrypt relationship-relevant information using data commonly stored on a mobile device. The encrypting and decrypting of mutual contact information are thus enabled without any prior interaction between device users in establishing encryption capabilities.

Owing to the convergence of communication and computing technologies, as well as signal processing technologies, a relationship discovery system can be integrated in or form a component of any mobile device that combines these capabilities. In one embodiment, a relationship discovery system is implemented as processor-executable code that executes on the processor of a mobile communication device such as a smartphone. In other embodiments, the relationship discovery system is implemented as processor-executable code that executes on the processor of a computing device such as a laptop, tablet, or the like, which also includes communication circuitry or a communications adapter for communicating with other devices. In various other embodiments, the relationship discovery system can be implemented as electronic circuitry integrated in such devices or as a combination of circuitry and code.

Figure 1:
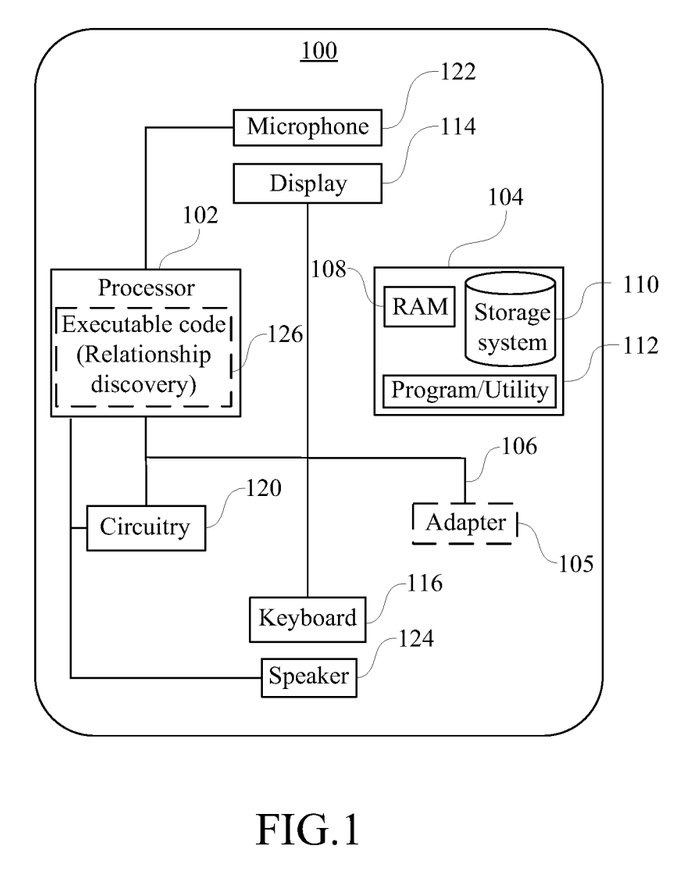
FIG. 1 depicts a representative mobile device with which a relationship discovery system is operable according to an embodiment of the present invention.

FIG. 1 depicts mobile device 100, which is representative of a device with which a relationship discovery system can be implemented according to one embodiment. Illustratively, mobile device 100 includes processor 102, memory 104, and bus 106, which electronically couples various components including the processor to the memory. Processor 102 can comprise a multi-core processor (e.g., quad core and octa core) having two or more independent processing units, termed cores, that read and execute program instructions (processor-executable code) concurrently. Each core can separately execute multiple instructions of programs specifically designed for parallel processing and drawn from various application domains, including general-purpose applications and specific-purpose applications such as digital signal processing.

Memory 104 can include computer-readable media in the form of volatile memory, such as random-access memory (RAM) 108 and/or cache memory (not explicitly shown). Storage system 110 can be provided for reading from and writing to a non-removable, non-volatile magnetic media. Memory 104 can include at least one program product having one or more program modules that are configured to carry out the functions of various embodiments of relationship discovery described herein. Bus 106 can comprise any of several types of bus structures, including a memory bus or memory controller, a peripheral bus, an accelerated graphics port, and a processor or local bus using any of a variety of bus architectures.

Program/utility 112, comprising one or more program modules, can be stored in memory 104 and can include an operating system, one or more application programs, other program modules, and program data. The program modules can carry out the functions and/or methodologies of various embodiments of relationship discovery described herein.

One or more of the program modules may include system for implementing a hidden relationship discovery system, or portions thereof. Program/utility 112 is executable by processor 102. Program/utility 112 and any data items used, generated, and/or operated upon by mobile device 100 are functional data structures that impart functionality when executed with processor 102. As defined herein, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Mobile device 100 also illustratively includes a screen or display 114 and keyboard 116 with which a user interacts with the mobile device. Alternatively, the mobile device can include a touchscreen for entering commands by touching the touchscreen and/or speech-recognition circuitry to enable the user to enter commands and receive output audibly. Optionally, mobile device 100 can include an adapter 118 with which to communicate with one or more networks such as a local area network (LAN), a general wide area network (WAN), and/or a public network (e.g., the Internet).

Mobile device 100 also illustratively includes a transceiver comprising communications circuitry 120, microphone 122, and speaker 124, each of which is electronically coupled to one another and to processor 102. A system for relationship discovery can be implemented as processor-executable code 126, which performs the operations for relationship discovery when executing on processor 102 and controls the transceiver comprising communications circuitry 120, microphone 122, and speaker 124.

The relationship discovery system can remain inoperable except during times of calamity or emergency when one or more network connections that are otherwise used for communicating with mobile device 100 are unavailable. For example, in the context of a cellular network, a cell tower may be down or a base station out of commission owing to some type of emergency or disaster. In one embodiment, the system becomes operable in response to a user command issued by voice and/or touch using command features of mobile device 100 described above. In another embodiment, however, the system operates continually in the background by periodically sampling network availability and automatically switching to operating mode (denoted herein as "discovery mode" or "help mode") when the system detects that network access has been unavailable for a predetermined length of time.

Operatively, when in discovery mode, processor-executable code 126 for relationship discovery causes mobile device 100 to intermittently broadcast the mobile user's contact information using the device's transceiver. In one embodiment, the contact information comprises phone numbers and corresponding names culled from a contact list that is electronically stored in memory 104 of mobile device 100. The contact information is encrypted prior to broadcast. In one embodiment, the contact information is plain text (e.g., stored contact name and corresponding phone number) is encrypted using a hash function to generate hash-encrypted text data.

Mobile device 100 can act as an ultrasonic transducer, which enables the mobile device to transmit and receive ultrasonic signals. In one embodiment, mobile device 100 includes a graphene-based acoustic transmitter/receiver. Graphene, a carbon allotrope, has mechanical properties that are suited for wide-band ultrasonic transduction. Low-cost fabrication methods can be used to produce graphene-based acoustic devices. Although the intensity of an acoustic wave decreases exponentially with distance, it is estimated that with sufficient power a 50 kHz ultrasonic signal can travel approximately 30 meters, while a 80 kHz ultrasonic signal can travel approximately 20 meters before being adsorbed, though humidity and temperature must be considered.

The relationship discovery system operating in discovery mode, causes mobile device 100 to convey the encrypted contact information in an ultrasonic signal broadcast through speaker 124. Contemporaneously, relationship discovery system causes mobile device 100 to capture with microphone 122 ultrasonic signals from a second mobile device that, using the same relationship discovery system, broadcasts encrypted contact information for a user of the second mobile device.

Each character of the contact information transmitted as an ultrasonic signal by mobile device 100 can be converted into the center of the transmission frequency range, which the transceiver transmits for a prespecified duration with speaker 124. Processor-executable code 126 of the relationship discovery system can cause processor 102 to perform a continuous Fourier transform of the ultrasonic signal and search for peaks in the frequency range. Finding a peak for a significant duration, the receiver can convert the frequency to the corresponding character.

In an embodiment in which contact information comprises phone numbers and corresponding names culled from a contact list electronically stored in memory 104 of mobile device 100, each phone number comprises a sequence of integers. All phone numbers and corresponding names in the contact list can be transmitted from the user's mobile device, or alternatively, only those phone numbers that have been selected by the user beforehand.

Figure 2:
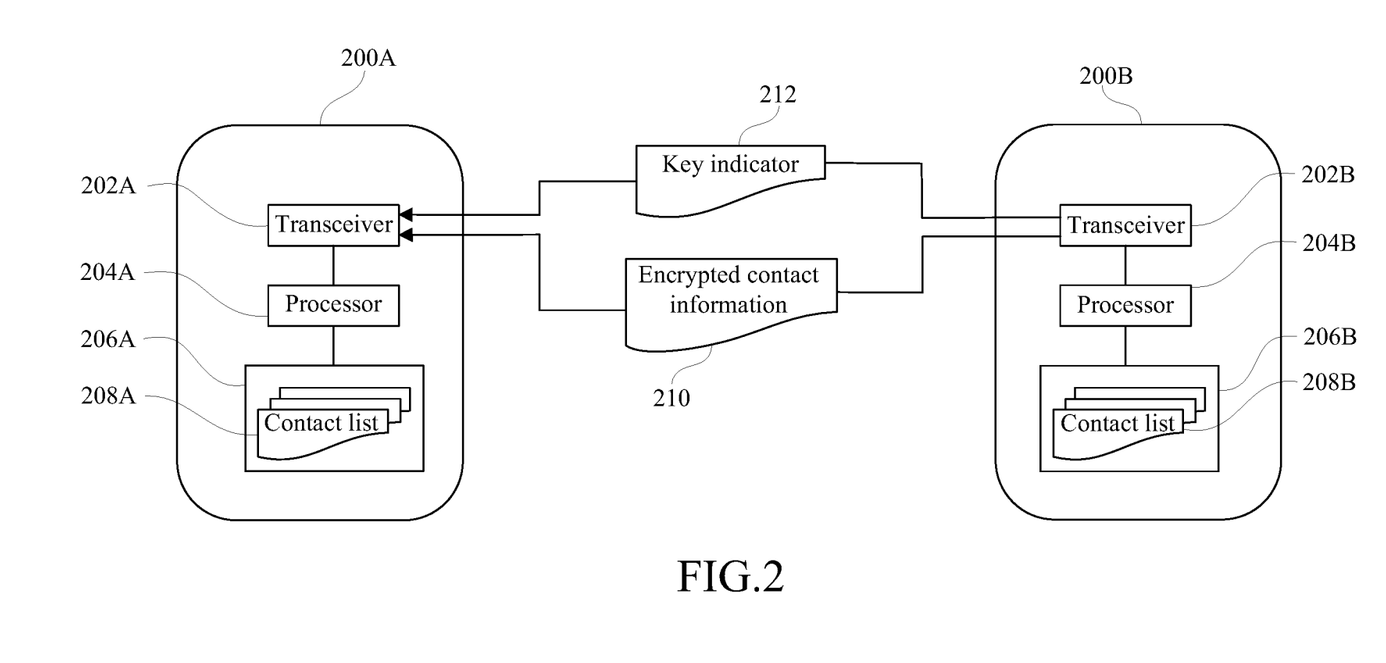
FIG. 2 depicts certain operative features of a relationship discover system according to an embodiment of the present invention.

FIG. 2 depicts a representative exchange of contact information between first mobile device 200A and second mobile 200B. First mobile device 200A illustratively comprises transceiver 202A, processor 204A, and memory 206A, which electronically stores contact list 208A. Second mobile device 200B illustratively comprises transceiver 202B, processor 204B, and memory 206B, which electronically stores contact list 208B. First mobile device 200A and second mobile device 200B each include a relationship discovery system, as described above, operating in discovery mode.

Each mobile device 200A, 200B operates that device's own, self-contained implementation of a relationship discovery system. The relationship discovery systems implemented separately in first mobile device 200A and second mobile device 200B enable the mobile devices to cooperate, but the relationship discovery system operating in each device operates independently of the relationship discovery system operating in the other mobile device. Thus, the operations described herein in terms of a first mobile device and a second mobile device can be performed with the roles of the respective mobile devices reversed.

Illustratively, the relationship discovery system implemented in first mobile device 200A causes the device to receive with transceiver 202A a pair of ultrasonic signals conveyed from second mobile device 200B. One of the ultrasonic signals, conveyed at a first frequency, transmits encrypted contact information 210 culled from contact list 208B of a user of second mobile device 200B. The other ultrasonic signal, conveyed at a second frequency, transmits a key indicator 212 corresponding to encrypted contact information 210.

The contact information, according to one embodiment, can comprise a contact name and contact phone number electronically stored in memory 206B of second mobile device 200B. All or only certain user-selected contact names and corresponding contact phone numbers of contact list 208B can be automatically broadcast by second mobile device 200B operating with the relationship discovery system operating in discover mode. When multiple contact list entities are broadcast, the entities can be broadcast in any order, including randomly. Each entity is conveyed, however, as a pair of ultrasonic signals—the contact information in encrypted form conveyed at a one frequency and the key indicator at a different frequency. The pair of ultrasonic signals is transmitted in the same order (if more than one pair of ultrasonic signals is transmitted by second mobile device 200B) such that the key indicator corresponds to the encrypted contact information when received by first mobile device 200A.

Figure 3A:
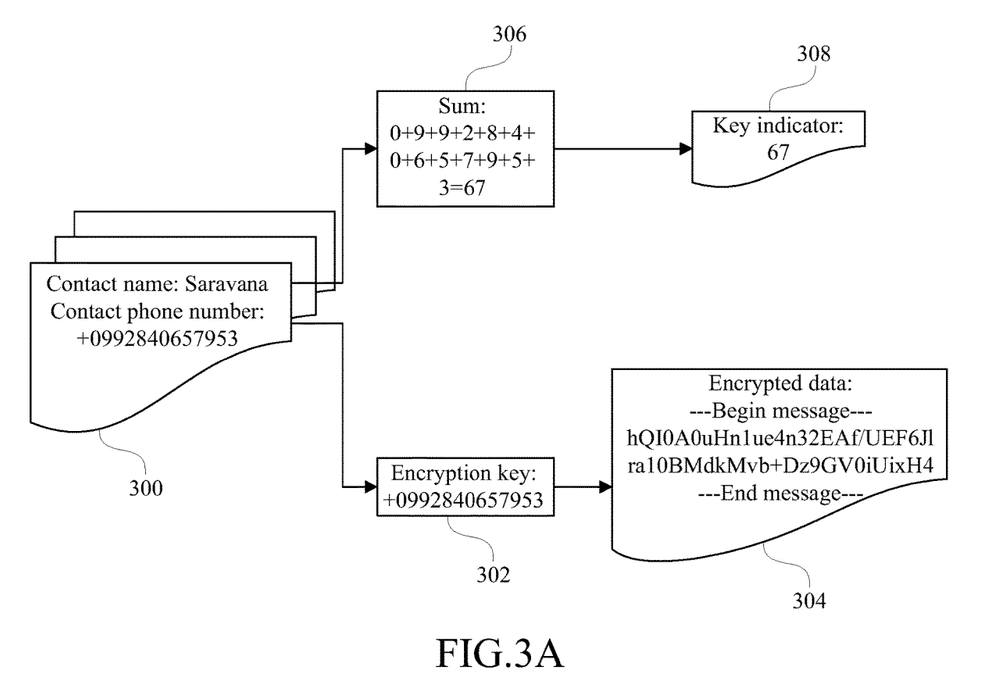
FIGS. 3A, 3B, and 3C depict certain operative features of a relationship discover system according to an embodiment of the present invention.
Figure 3B:
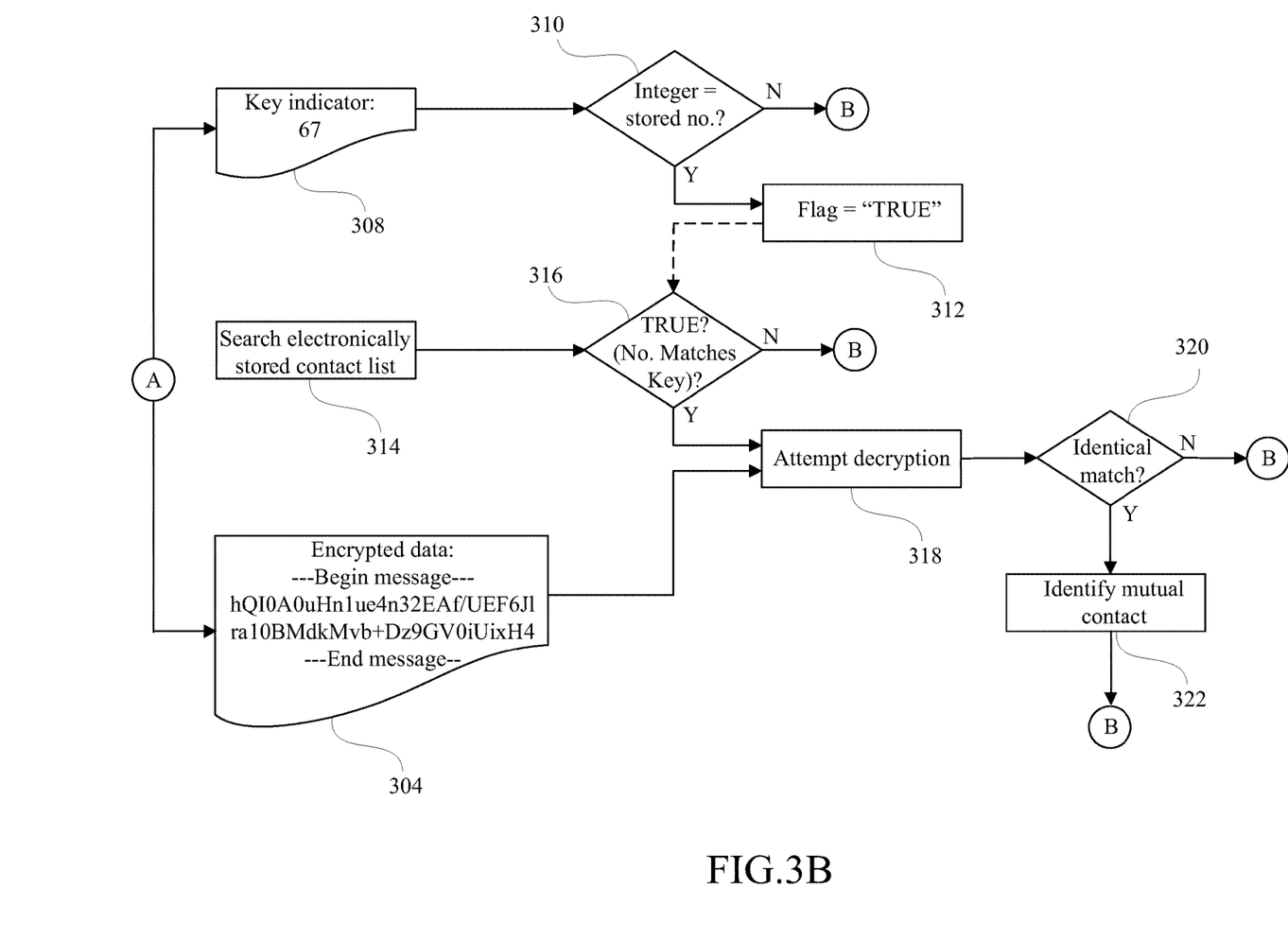
Figure 3C:
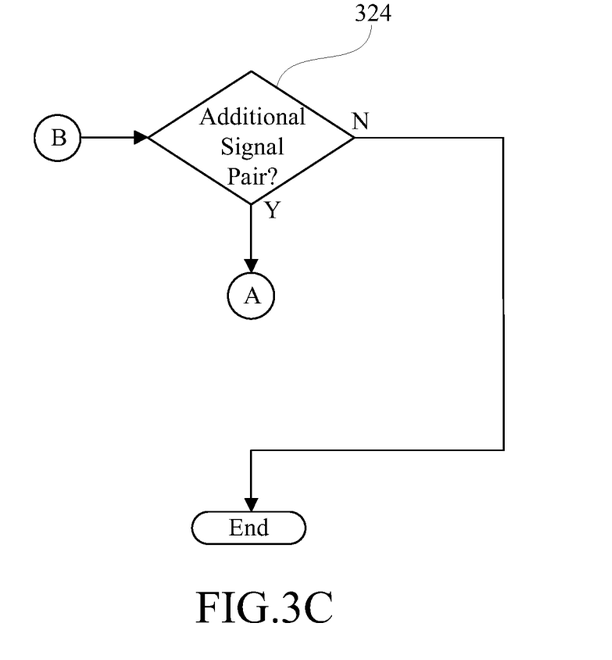

Referring additionally to FIGS. 3A, 3B, and 3C, the operative features of the relationship discovery system operating in first mobile device 200A and of the relationship discovery system operating in second mobile device 200B are illustrated. The systems operate cooperatively yet independently of one another on the respective mobile devices.

FIG. 3A depicts contact information 300, which according to one embodiment, comprises a contact name and corresponding contact phone number. The relationship discovery system operating in the second mobile device 200B (in the role of broadcasting mobile device) encrypts contact information 300 using the sequence of integers that comprises the contact phone number as encryption key 302. Encryption key 302 is used to encrypt the contact information, which is broadcast as encrypted data 304. Encryption key 302 is the sequence of integers that comprises the contact phone number. The relationship discovery system at 306 sums the same sequence of integers that comprises the contact phone number to generate a sum 306 (an integer or, equivalently, a whole number). The sum 306 is used as key indicator 308.

FIG. 3B depicts the operations performed by the relationship discovery system operating in the first mobile device 200A (in the role of receiving mobile device). In response to receiving the above-described pair of ultrasonic signals at different frequencies, respectfully, the relationship discovery system identifies key indicator 308 at the frequency designated for the signal conveying the key indicator. The relationship discovery system searches a contact list electronically stored in contact list 208A to determine whether the sum of the sequence of integers comprising any phone number in the contact list is equal to the whole number representing key indicator 308. If the relationship discovery system determines at 310 that the sum of integers comprising a phone number in contact list 208A equals the whole number representing key indicator 308, then the phone number is flagged (e.g., "TRUE") at 312.

The relationship discovery system at 314 searches contact list 208A electronically stored in memory 206A. If at 316 a phone number in contact list 208A is identified as being flagged "TRUE," then at 318 the sequence of integers comprising the phone number is used for attempting to decrypt encrypted data 304. If at 320 the sequence of integers of the contact phone number stored in contact list 208A identically matches the sequence of integers of the contact phone number culled from contact list 208B (which is included in the contact information and was used to encrypt the contact information transmitted by second mobile device 200B), then decryption is successful. Otherwise the decryption fails. If decryption is successful at 320, then a mutual contact of both a user of first mobile device 200A and a user of second mobile device 200B is identified at 322.

FIG. 3C depicts the relationship discovery system response if at 310 the system determines that there is not at least one phone number in contact list 208A comprising a sequence of integers whose sum equals the whole number representing key indicator 308. If not, then the system determines at 324 whether an additional signal pair—encrypted contact information at one frequency and corresponding key indicator at a different frequency—has been received, in which event the process repeats with respect to that signal pair. Otherwise, the process end. Likewise, if no phone number in contact list 208A that is flagged "TRUE" comprises a sequence of integers that identically matches the sequence of integers of the contact phone number culled from contact list 208B (and thus decrypts the encrypted contact information) at 320, then then the system determines at 324 whether an additional signal pair has been received, in which event the process repeats with respect to that signal pair. Otherwise, the process end. If a mutual contact is identified at 322, the system proceeds to determine at 324 whether an additional signal pair has been received. If so, the process repeats with respect to that signal pair. If not, the process ends.

As described, contact information broadcast by second mobile device 200B can be encrypted using the sequence of integers of a phone number as an encryption key. If a phone number saved in the contact list 208A of first mobile device 200A—selected based on corresponding key indicator 308 (integer or whole number) separately received from second mobile device 200B—comprises the identical sequence of integers, then that sequence of integers operates as a symmetric key to decrypt the received contact information. Successful decryption at a receiving mobile device thus requires a phone number, stored on the receiving mobile device, that comprises a sequence of integers (1) that sum to a number equal to the received key indicator and (2) that identically match the sequence of integers used to encrypt the received contact information. Accordingly, in one embodiment, the discovery relationship system uses a common phone number electronically stored on two separate mobile devices as a symmetric encryption key.

Figure 4:
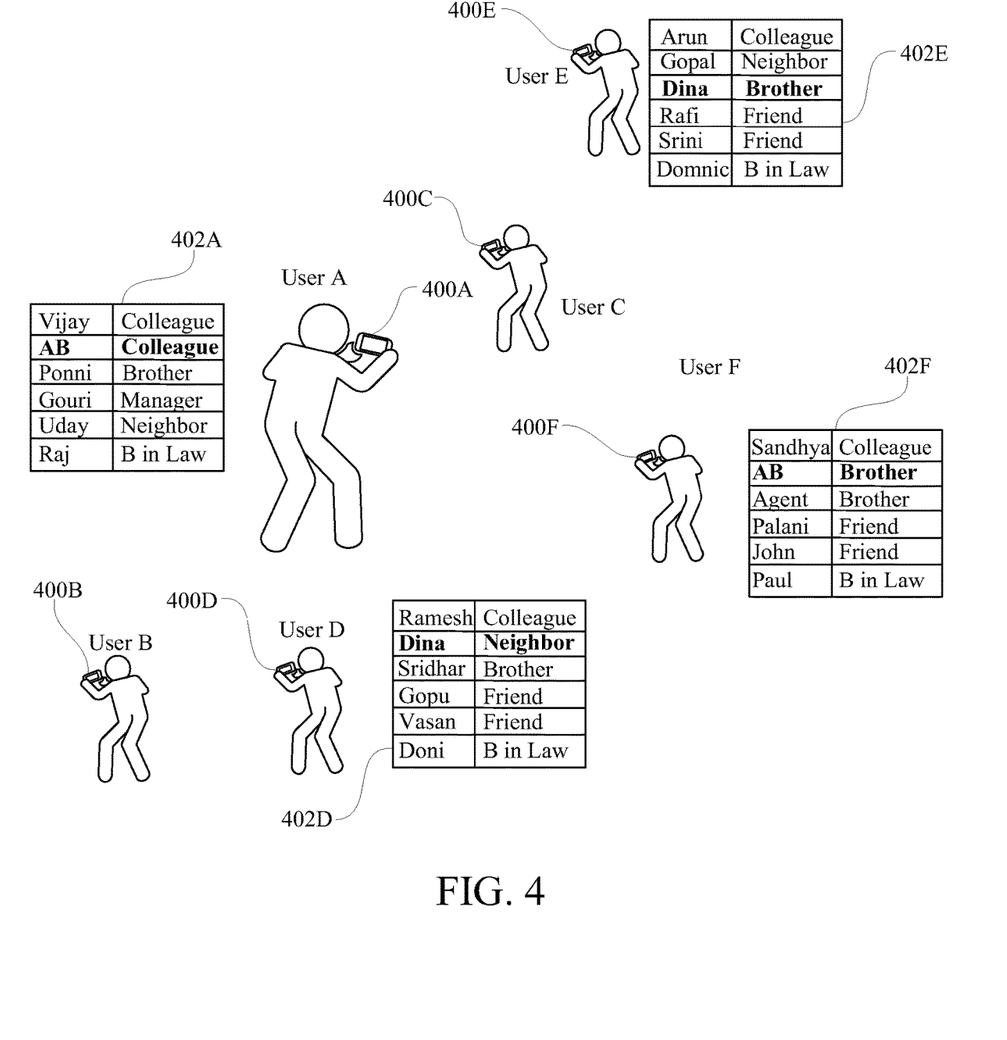
FIG. 4 depicts an operative feature of a relationship discover system according to an embodiment of the present invention.

FIG. 4 illustrates the discovery of relationships (or lack thereof) among five users whose mobile devices 400A, 400B, 400C, 400D, 400E execute the relationship discovery system as described. Illustratively, User A's contact list 402A includes a contact (colleague) that is the same as a contact (brother) present in the contact list 402F of User F. The mutual contact so identified reveals a relationship shared by both User A and User F. Likewise, as illustrated, User D's contact list 402D includes a contact (neighbor) that is the same as a contact (brother) present in the contact list 402E of User E. Neither User B nor User C share any mutual contacts with any of the other users.

Figure 5:
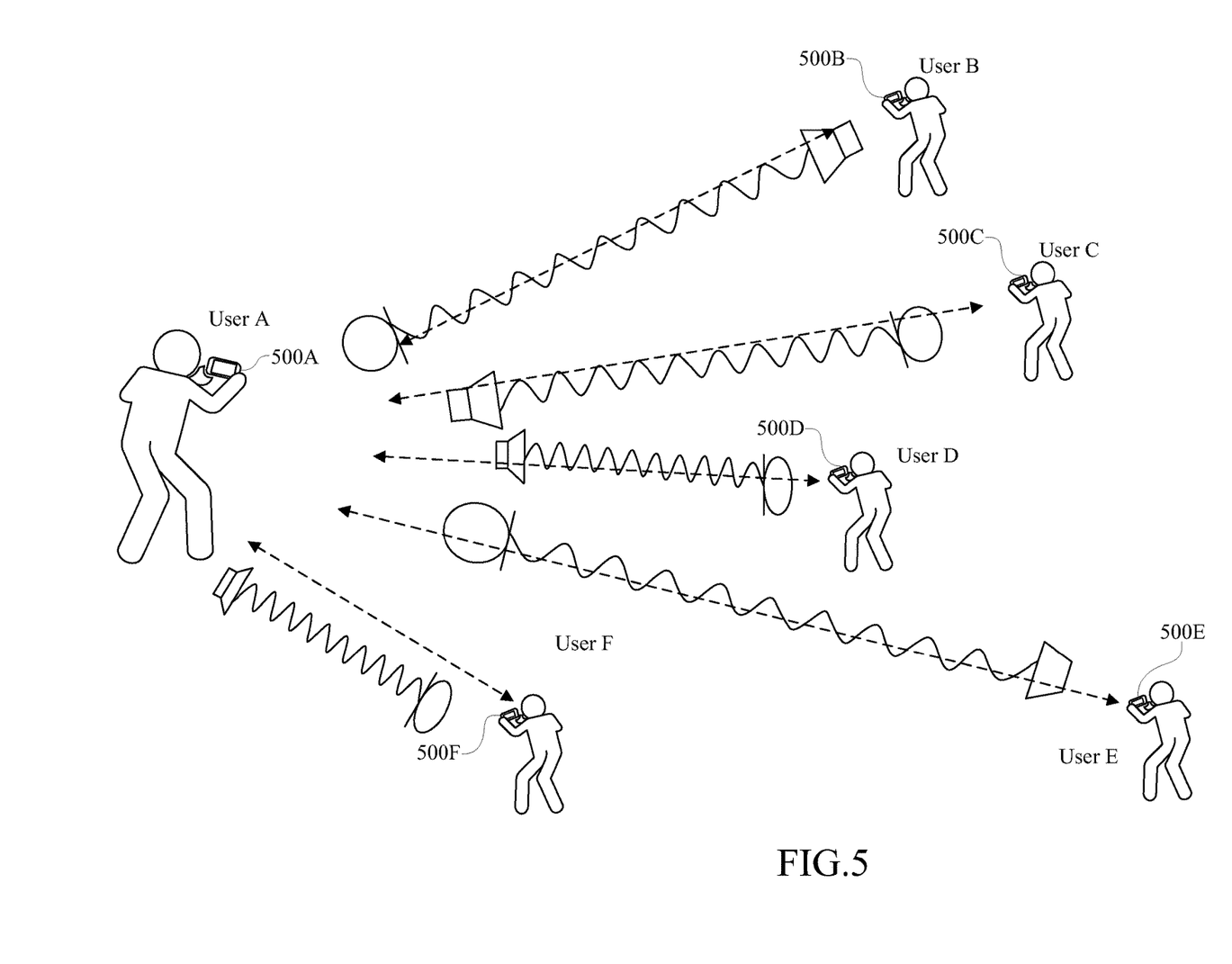
FIG. 5 depicts another operative feature of a relationship discover system according to an embodiment of the present invention.

Another aspect of a relationship discovery system, according to another embodiment, is depicted in FIG. 5. The relationship discovery system executing on mobile device 500A, according to this embodiment, uses an ultrasonic signaling component of the mobile device to determine location indicia corresponding to other mobile devices 500B, 500C, 500D, 500E, 500F that are close by and that also are executing the relationship discovery system. The location indicia can include, for example, a distance of each mobile device 500B-500F from mobile device 500A and an angle of each mobile device 500B-500F relative to mobile device 500A. Known techniques of sound wave origin detection can be used to determine location indicia using, for example, multiple sound wave transducer/amplifier units with or integrated in the mobile device and operatively coupled to a display of the device.

In one embodiment, a mobile device operating in discovery mode emits sound waves that can be detected by another mobile device also operating in discovery mode using passive acoustic location detection. In response to establishing a mutual contact, the relationship discovery system of each mobile device can determine the direction of the other mobile device using two or more sound wave transducers (either integrated in the mobile device or as a separate unit operatively coupled to the mobile device) to detect emitted sound waves. The relationship discovery system can process data derived from the received sound waves using a sound source localization algorithm such as the Steered-Response Power Phase Transform (SRP-PHAT) algorithm, for example. The SRP-PHAT algorithm has demonstrated particularly robust capabilities in noisy and reverberant environments.

Figure 6:
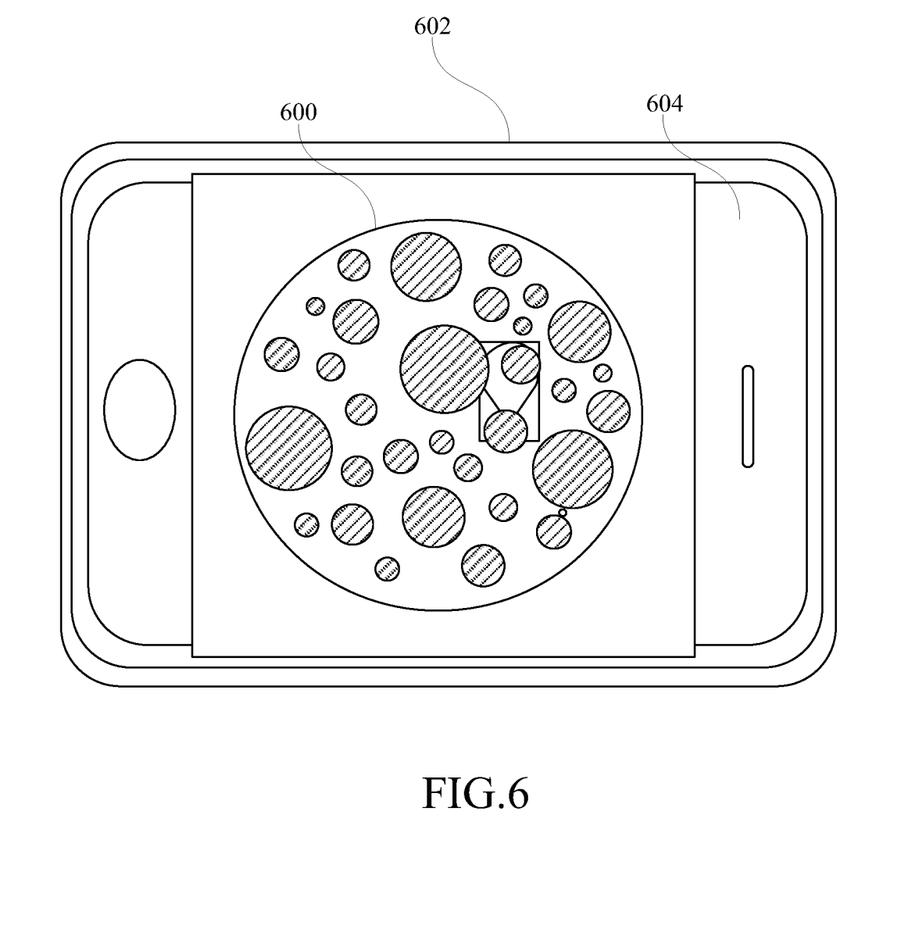
FIG. 6 depicts still another operative feature of a relationship discover system according to an embodiment of the present invention.

Still another aspect of a relationship discovery system, according to yet another embodiment, is depicted in FIG. 6. Successful decryption by the relationship discovery system of information received from another mobile device executing the relationship discovery system can optionally generate a user interface. Illustratively, user interface 600 is generated to appear on the display 602 of the receiving mobile device 604. The user interface 600 can depict symbolically the spatial orientation of other relationship discovery users having mutual contacts with the user of the mobile device 604. Illustratively, the nearby user devices are indicated by circles. The square indicates mobile device 604. In one embodiment, the symbols can indicate an assessed strength (e.g., relative sizes of circles) of mutual contact relationships, where "strength" is defined in this context as a hierarchical relationship (e.g., family member ranked greater than friend, which is ranked greater than colleague or neighbor) and/or numerical relationship (e.g., number of mutual contacts identified for any pair of individuals).

Contact information optionally can also include a physical description of the user conveying the information. For example, a user can describe clothing the user is currently wearing and/or articles the user is carrying so that if and when a hidden relationship is discovered with another individual who is nearby that individual can be more readily recognized the user. In another embodiment, the user can include a self-identifying photograph that is stored on the user's mobile device for transmission by the relationship discovery system when operating in discovery mode.

Figure 7:
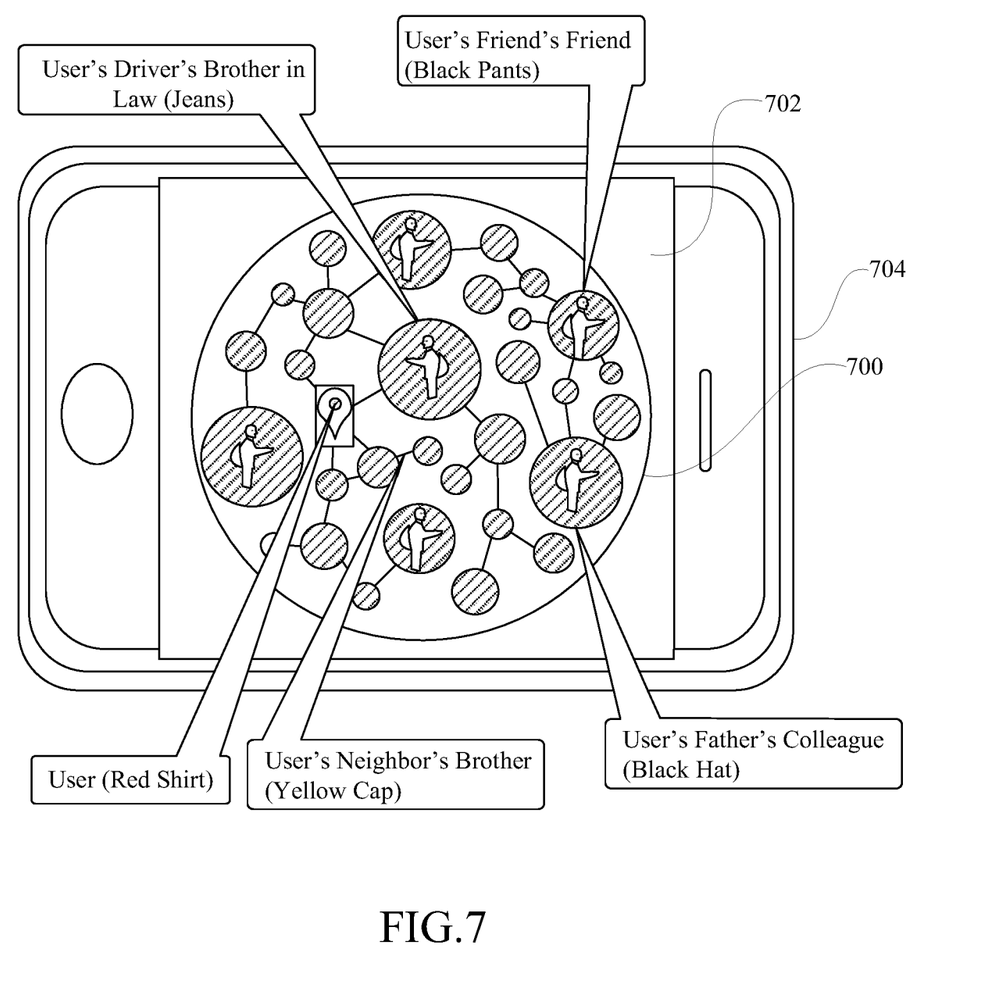
FIG. 7 depicts yet another operative feature of a relationship discover system according to an embodiment of the present invention.

FIG. 7 depicts another embodiment of a relationship discovery system that combines two earlier-described features: the map generation and self-identification information. As illustrated, user interface 700 is generated to appear on the display 702 of the receiving mobile device 704. The user interface 700 displays the spatial orientation of other devices equipped with the relationship discovery system having mutual contacts with the user of the mobile device 704. Overlaid on each position of spatial location is a corresponding description and/or photograph of an individual identified by the relationship discovery system as sharing a common contact with the user of mobile device 704.

Figure 8:
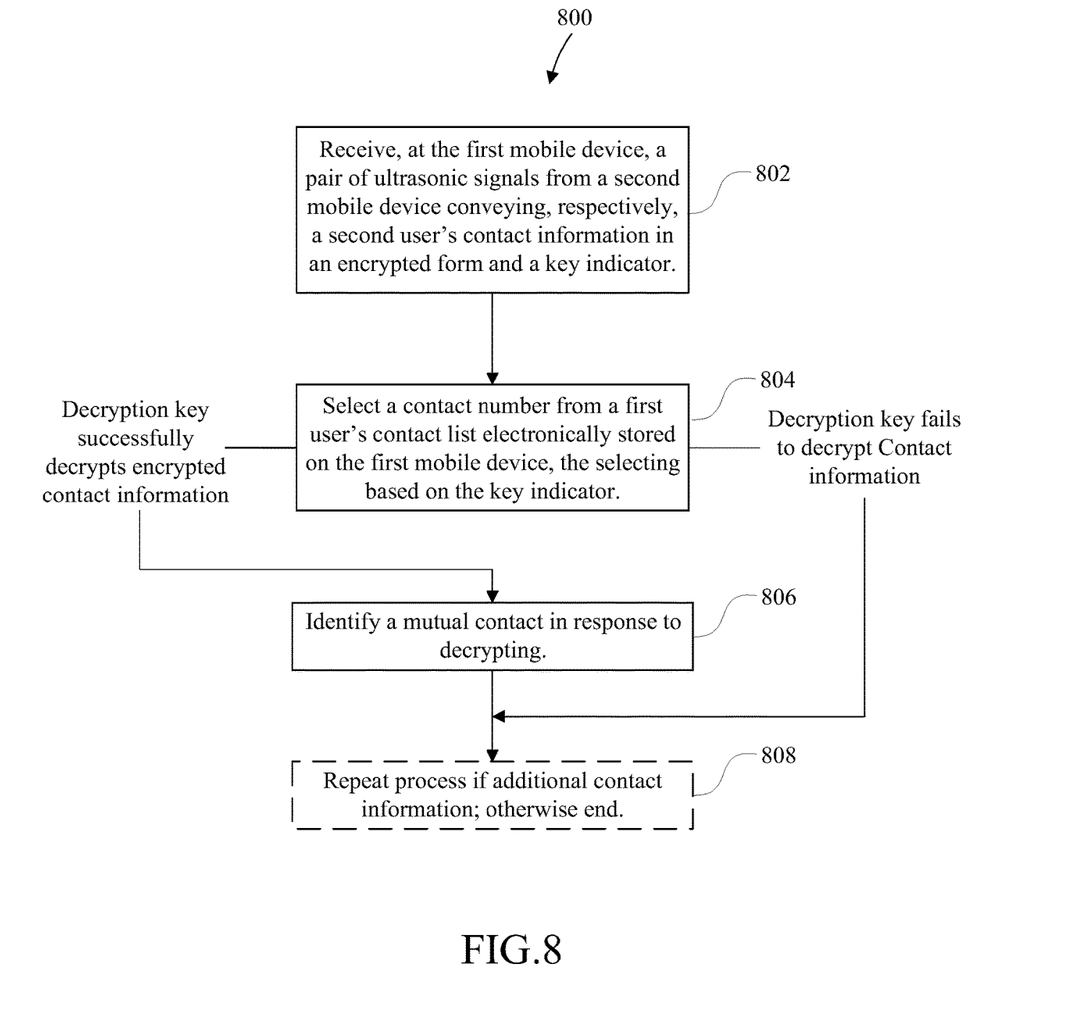
FIG. 8 is a flowchart of a method of relationship discovery according to an embodiment of the present invention.

FIG. 8 is a flowchart of a method 800 for relationship discovery according to one embodiment. Method 800 can be performed by a mobile device (denoted as first mobile device) executing a relationship discovery system the same as or similar to the systems described in reference to FIGS. 1-7. The method can begin at 802 with the first mobile device receiving a pair of ultrasonic signals from another mobile device (denoted as second mobile device). The ultrasonic signals convey, at one frequency, contact information in an encrypted form and, at a different frequency, a key indicator corresponding to the encrypted information. The contact information is culled from contact information stored electronically on the second mobile device for a user (denoted as second user) of the second mobile device. At 804, a contact number is selected from a contact list electronically stored on the first mobile device for a user (denoted as first user) of the first mobile device. The contact number is selected from the first user's contact list based on the key indicator.

The contact number selected from the first user's contact list is used as a decryption key for attempting to decrypt the encrypted contact information culled from the second user's contact list. If decryption is successful, then at 806 the first mobile device identifies a mutual contact. The mutual contact is one shared by the user of the first mobile device (first user) and the user of the second mobile device (second user). Otherwise, if decryption fails, then no mutual contact is identified. The first mobile device at 808 can optionally repeat the process with any additional contact information received, whether from the second mobile device or from another mobile device nearby. Optionally, the first mobile device can also broadcast a pair of ultrasonic signals, one ultrasonic signal conveying encrypted contact information at one frequency and the other ultrasonic signal conveying a corresponding key indicator at a different frequency.

Figure 9:
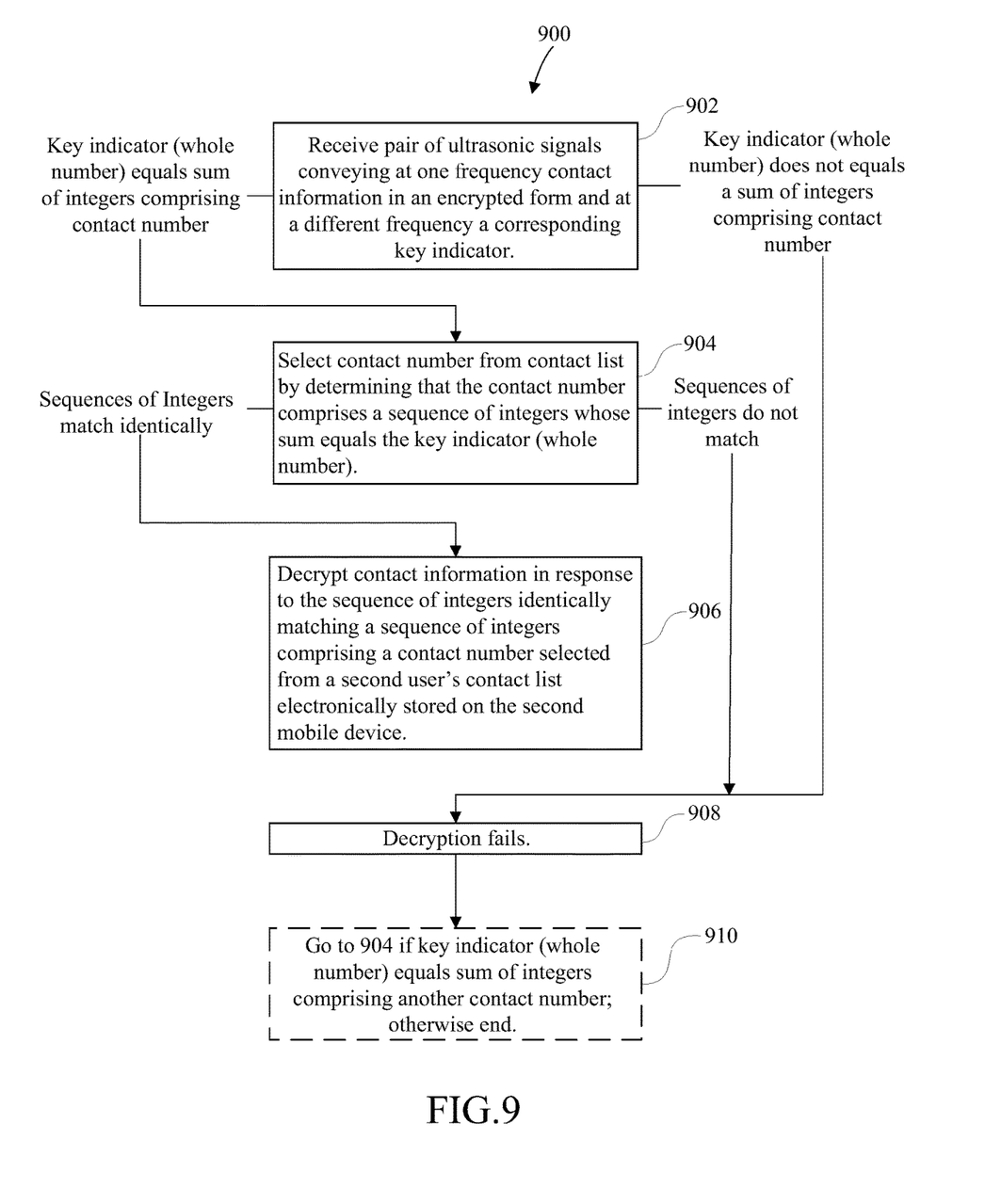
FIG. 9 is a flowchart of a method for encrypting and decrypting relationship discovery data according to an embodiment of the present invention.

FIG. 9 is a flowchart of a method 900 for decrypting encrypted contact information according to one embodiment of a method for relationship discovery. Method 900 also can be performed by a mobile device executing a relationship discovery system the same as or similar to the systems described in reference to FIGS. 1-7. Method 900 can begin with the mobile device (denoted as first mobile device) receiving a pair of ultrasonic signals from another mobile device (denoted as second mobile device) at 902. One of the ultrasonic signals, at one frequency, conveys encrypted contact information, and the other ultrasonic signal, at a different frequency, conveys a corresponding key indicator. The contact information comprises, albeit in encrypted form, a contact name and corresponding contact phone number, which are electronically stored on the second mobile device for a user (denoted as second user) of the second device. The corresponding key indicator is an integer or whole number.

At 904, a contact number is selected from a contact list electronically stored on the first mobile device for a user (denoted as first user) of the mobile device. The contact number is selected by determining that the contact number comprises a sequence of integers whose sum equals the whole number (or integer) representing the key indicator. If the sum does not equal the whole number, decryption fails at 908. If at 910, however, there is another contact number in the contact list comprising sequence of integers whose sum also equals the whole number (or integer) representing the key indicator, the process can be repeated beginning at 904. Otherwise the process ends at 910.

If at 904, a contact number comprises a sequence of integers whose sum equals the whole number (or integer) representing the key indicator, then the contact number is used for attempting to decrypt the encrypted contact information. The contact information is encrypted using as the encryption key a contact number selected from a second user's contact list, specifically the contact number conveyed (albeit in encrypted form) along with other contact information. If the sequence of integers of the contact number selected from the first user's contact list identically matches the sequence of integers comprising the contact number selected from the second user's contact list, then at 906 the decryption is successful. Thus, the second user's contact information is decrypted in response to the sequence of integers of the selected contact number identically matching the sequence of integers comprising the contact number selected from a second user's contact list electronically stored on the second mobile device. Otherwise, the decryption fails at 908. Unless there is another contact number in the first user's contact list comprising a sequence of integers whose sum equals the whole number, or integer, representing the key indicator (in which case the process can be repeated beginning at 904), the process ends at 910.

In one embodiment, a second user's contact information when received at the first mobile device and successfully decrypted can include identifying information describing a physical appearance of a user of the second mobile device. In another embodiment, the contact information can include mutual contact relationship information indicating a relationship of a user of the second mobile device with an individual who has a relationship with a user of the first mobile device.

In still another embodiment, the relationship discover method can further include determining a location of the second mobile device relative to the first mobile device in response to identifying a mutual contact. The method, according to yet another embodiment, can further include responding to the identifying a mutual contact by generating a map that is rendered with a display of the first mobile device and that indicates a spatial relationship between the first mobile device and the second mobile device. In another embodiment, the method can further include emitting a physiologically perceptible signal (e.g., visual or aural) with the first mobile device in response to identifying a mutual contact.

The various embodiments can be implemented as a computer program product at any possible technical detail level of integration. The computer program product can include a computer readable storage medium (or media) having computer readable program code stored therein, the program code executable by computer hardware to initiate operations including those described herein.

The computer readable storage medium can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination thereof. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described herein can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform the operations described herein.

Certain embodiments described herein are described with reference to flowchart illustrations and/or block diagrams of methods, apparatus (systems), and computer program products. It is expressly noted and is to be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In certain other implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose, hardware-based systems that perform the specified functions or acts or carry out combinations of special purpose hardware and computer instructions.

FIGS. 1-9 are conceptual illustrations allowing for a full explanation of the embodiments described. Notably, the figures and examples above are not meant to limit the scope of the disclosure to a single embodiment, as other embodiments are possible by way of interchange of some or all of the described or illustrated elements. Moreover, where certain elements can be partially or fully implemented using known components, only those portions of such known components that are necessary for an understanding of the disclosure are described, and detailed descriptions of other portions of such known components are omitted so as not to obscure the described embodiments. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the disclosure encompasses present and future known equivalents to the known components referred to herein by way of illustration.

The descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

That which is claimed is:

1. A method, comprising:
    receiving, at a first mobile device, a pair of ultrasonic signals at different frequencies from a second mobile device, the pair of ultrasonic signals conveying, respectively, a second user's contact information in an encrypted form and a key indicator;
    selecting a contact number from a first user's contact list electronically stored on the first mobile device, the selecting based on the key indicator; and responsive to decrypting the second user's contact information using the contact number as a decryption key, identifying a mutual contact.

2. The method of claim 1, further comprising broadcasting, with the first mobile device, an ultrasonic signal conveying a first user's contact information in an encrypted form.

3. The method of claim 1, wherein the key indicator is a whole number and the decrypting the second user's contact information comprises:
  selecting the contact number from the first user's contact list by determining that the contact number comprises a sequence of integers whose sum equals the whole number; and
  decrypting the second user's contact information in response to the sequence of integers identically matching a sequence of integers comprising a contact number selected from a second user's contact list electronically stored on the second mobile device.

4. The method of claim 1, wherein the second user's contact information includes identifying information describing a physical appearance of a user of the second mobile device.

5. The method of claim 1, further comprising, in response to the identifying a mutual contact, determining a location of the second mobile device relative to the first mobile device.

6. The method of claim 1, wherein the second user's contact information includes mutual contact relationship information indicating a relationship of a user of the second mobile device with an individual who has a relationship with a user of the first mobile device.

7. The method of claim 1, further comprising, in response to the identifying a mutual contact, generating a map that is rendered with a display of the first mobile device and that indicates a spatial relationship between the first mobile device and the second mobile device.

8. The method of claim 1, further comprising, in response to identifying a mutual contact, emitting a physiologically perceptible signal with the first mobile device.

9. A system, comprising:
  a transceiver of a first mobile device configured to receive a pair of ultrasonic signals at different frequencies from a second mobile device, the pair of ultrasonic signals conveying, respectively, a second user's contact information in an encrypted form and a key indicator; and
  at least one processor operatively coupled to the transceiver and programmed to initiate executable operations, the executable operations including:
    selecting a contact number from a first user's contact list electronically stored on the first mobile device, the selecting based on the key indicator; and
    responsive to decrypting the second user's contact information using the contact number as a decryption key, identifying a mutual contact.

10. The system of claim 9, wherein the transceiver is configured to broadcast an ultrasonic signal conveying a first user's contact information in an encrypted form.

11. The system of claim 9, wherein the key indicator is a whole number and wherein the decrypting the second user's contact information comprises:
  selecting the contact number from the first user's contact list by determining that the contact number comprises a sequence of integers whose sum equals the whole number; and
  decrypting the second user's contact information in response to the sequence of integers identically matching a sequence of integers of a contact number selected from a second user's contact list electronically stored on the second mobile device.

12. The system of claim 9, wherein the second user's contact information includes identifying information describing a physical appearance of a user of the second mobile device.

13. The system of claim 9, wherein the executable operations further include, responsive to the identifying a mutual contact, determining a location of the second mobile device relative to the first mobile device.

14. The system of claim 9, wherein the second user's contact information includes mutual contact relationship information indicating a relationship of a user of the second mobile device with an individual who has a relationship with a user of the first mobile device.

15. The system of claim 9, wherein the executable operations further include, responsive to the identifying a mutual contact, generating a map that is rendered with a display of the first mobile device and that indicates a spatial relationship between the first mobile device and the second mobile device.

16. The system of claim 9, wherein the executable operations further include, in response to identifying a mutual contact, emitting a physiologically perceptible signal with the first mobile device.

17. A computer program product, comprising:
  a computer-readable storage medium having program code stored thereon, the program code executable by a processor of a first mobile device for initiating operations including:
    receiving, at the first mobile device, a pair of ultrasonic signals at different frequencies from a second mobile device, the pair of signals conveying, respectively, a second user's contact information in an encrypted form and a key indicator;
    selecting a contact number from a first user's contact list electronically stored on the first mobile device, the selecting based on the key indicator; and
    responsive to decrypting the second user's contact information using the contact number as a decryption key, identifying a mutual contact.

18. The computer program product of claim 17, wherein the operations further include broadcasting, with the first mobile device, an ultrasonic signal conveying a first user's contact information in an encrypted form.

19. The computer program product of claim 17, wherein the key indicator is a whole number and the decrypting the second user's contact information comprises:
  selecting the contact number from the first user's contact list by determining that the contact number comprises a sequence of integers whose sum equals the whole number; and
  decrypting the second user's contact information in response to the sequence of integers identically matching a sequence of integers of a contact number selected from a second user's contact list electronically stored on the second mobile device.

20. The computer program product of claim 17, wherein the second user's contact information includes identifying information describing a physical appearance of a user of the second mobile device.

* * * * *